(12) United States Patent
Wallentin et al.

(10) Patent No.: US 9,826,395 B2
(45) Date of Patent: Nov. 21, 2017

(54) METHODS AND DEVICES FOR ADDRESSING DEVICE TO DEVICE COMMUNICATIONS

(71) Applicant: TELEFONAKTIEBOLAGET L M ERICSSON (PUBL), Stockholm (SE)

(72) Inventors: Pontus Wallentin, Linköping (SE); Fredrik Gunnarsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/441,597

(22) PCT Filed: Mar. 13, 2015

(86) PCT No.: PCT/SE2015/050285
§ 371 (c)(1),
(2) Date: May 8, 2015

(87) PCT Pub. No.: WO2015/142250
PCT Pub. Date: Sep. 24, 2015

(65) Prior Publication Data
US 2016/0050558 A1 Feb. 18, 2016

Related U.S. Application Data

(60) Provisional application No. 61/968,871, filed on Mar. 21, 2014.

(51) Int. Cl.
H04W 8/26 (2009.01)
H04W 8/00 (2009.01)
H04L 29/12 (2006.01)

(52) U.S. Cl.
CPC ........... *H04W 8/26* (2013.01); *H04L 61/2038* (2013.01); *H04W 8/005* (2013.01);
(Continued)

(58) Field of Classification Search
None
See application file for complete search history.

(56) References Cited

U.S. PATENT DOCUMENTS 6,061,449 A * 5/2000 Candelore ........... G06F 12/1408
380/28
6,832,373 B2 * 12/2004 O'Neill .................... G06F 8/65
714/25

(Continued)

FOREIGN PATENT DOCUMENTS

EP 2787658 A1 10/2014
WO 2013081433 A1 6/2013

OTHER PUBLICATIONS

International Searching Authority, Invitation to pay additional fees, communication relating to the results of the partial international search, issued in corresponding International Application No. PCT/SE2015/050285, dated Jul. 2, 2015, 7 pages.

(Continued)

Primary Examiner — Gregory Sefcheck
(74) Attorney, Agent, or Firm — Rothwell, Figg, Ernst & Manbeck, P.C.

(57) ABSTRACT

A method implemented in a first user equipment (UE) includes generating a first intermediate address. The method further includes transmitting a data packet using the first intermediate address by (i) applying a first address mechanism to a first part of the first intermediate address, and (ii) applying a second address mechanism to a second part of the first intermediate address.

29 Claims, 15 Drawing Sheets

(52) U.S. Cl.
CPC ...... *H04L 61/2069* (2013.01); *H04L 61/6022* (2013.01); *H04L 61/6072* (2013.01)

(56) References Cited

U.S. PATENT DOCUMENTS

| | | | | |
|---|---|---|---|---|
| 7,325,059 B2* | 1/2008 | Barach | ............... | H04L 45/00 709/225 |
| 7,752,324 B2* | 7/2010 | Hamadeh | ............... | H04L 29/06 709/230 |
| 7,805,719 B2* | 9/2010 | O'Neill | ............... | G06F 8/65 717/168 |
| 8,006,078 B2* | 8/2011 | Lee | ............... | G06F 9/322 712/233 |
| 8,199,652 B2* | 6/2012 | Lim | ............... | H04L 45/00 370/235 |
| 8,272,060 B2* | 9/2012 | Milliken | ............... | G06F 21/562 713/178 |
| 8,619,995 B2* | 12/2013 | Haddad | ............... | H04L 29/12301 380/28 |
| 8,644,860 B2* | 2/2014 | Willey | ............... | H04W 68/025 455/432.2 |
| 8,837,327 B2* | 9/2014 | Liu | ............... | H04L 41/042 370/255 |
| 8,902,855 B2* | 12/2014 | Etemad | ............... | H04W 36/14 370/331 |
| 9,072,027 B2* | 6/2015 | Vasudevan | ............... | H04W 76/043 |
| 9,118,464 B2* | 8/2015 | Nix | ............... | H04W 52/0235 |
| 9,173,089 B2* | 10/2015 | Sridharan | ............... | H04W 8/26 |
| 9,198,137 B2* | 11/2015 | Koskela | ............... | H04W 4/005 |
| 9,226,329 B2* | 12/2015 | Mukherjee | ............... | H04W 76/023 |
| 2010/0189264 A1 | 7/2010 | Haddad et al. | | |
| 2014/0047128 A1* | 2/2014 | Correll | ............... | H04L 29/1232 709/245 |
| 2015/0124704 A1* | 5/2015 | Asterjadhi | ............... | H04L 69/04 370/328 |

OTHER PUBLICATIONS

International Search Report and the Written Opinion of the International Searching Authority dated Sep. 8, 2015, in International Application No. PCT/SE2015/050285, 17 pages.

3GPP, 3rd Generation Partnership Project; Technical Specification Group Services and System Aspects; Proximity-based services (ProSe); Stage 2 (Release 12), 3GPP TS 23.303 V12.0.0, 2014, 53 pages.

Ericsson "D2D communication addressing" 3GPP TSG RAN WG2 #84, Tdoc R2-134237, 2013, 4 pages.

* cited by examiner

METHODS AND DEVICES FOR ADDRESSING DEVICE TO DEVICE COMMUNICATIONS

CROSS REFERENCE TO RELATED APPLICATION

This application is a 35 U.S.C. 371 National Phase Entry Application from PCT/SE2015/050285, filed Mar. 13, 2015, which claims the benefit of U.S. Patent Application No. 61/968,871 filed on Mar. 21, 2014, the disclosures of which are incorporated herein in their entirety by reference.

TECHNICAL FIELD

This disclosure relates generally to device to device communications, more particularly, to methods and devices for addressing device to device communications.

BACKGROUND

Traditional communication in terrestrial radio networks is via links between User Equipments (UEs) and base stations. However, when two UEs are in the vicinity of each other, then direct device to device (D2D) communication may be an option. D2D communication may be dependent on synchronization information from either a base station or a different node such as a cluster head (CH) (i.e., a UE acting as a synchronization source) providing local synchronization information, or a UE enabled to relay synchronization information from a different synchronization source. The synchronization source from enhanced nodeB (eNB)/CH is used for intra-cell/cluster communication. The relayed synchronization signal is used for inter-cell/cluster communication.

In order to support at least Public Safety scenarios, the UE behavior is mapped to different coverage states. These coverage states are dependent on the UE being In network Coverage (InC) or Out of network Coverage (OoC). One state is "UL+DL-coverage" (State A). In this state, a UE is expected to be able to establish an RRC connection, if needed, and therefore, D2D transmission in this area uses granted resources.

Another state is "Edge-of-Coverage" (State B). In this state, a UE is expected to be able to at least detect broadcast system information transmitted by the eNB, and hence D2D transmission is based on broadcasted D2D resources.

Another state is "OoC with relayed control plane detected" (State C). In this state, a UE is OoC but it detects a control plane originally from an eNB and relayed by an in-coverage UE. Therefore, D2D transmission in this state uses resources that are relayed by a CP relay UE (on the PD2DSCH) and originally from an eNode B.

Another state is "OoC" (State D). In this state, a UE is OoC and unable to detect a control plane originally from an eNB and relayed by a in-coverage UE. In this case the UE uses pre-configured resources for D2D transmission.

FIG. 1 illustrates the states discussed above. UE A can use the D2D functionalities supported in coverage state A, while UE B only supports D2D functionalities according to state B. UE C only support D2D functionalities according to state C, and UE D, in this case, is out of network coverage (state D).

In the 3GPP specification, the following definitions have been made on the identifiers for communication for Proximity-based Services:

ProSe UE ID: This ID is a link layer identifier assigned by the EPS that uniquely represents the UE in the context of ProSe Direct Communication. This ID is used as a source Layer-2 address in all the packets the UE sends for ProSe Direct Communication ProSe Layer-2 Group ID: This ID is a link layer identifier that identifies the group in the context of one-to-many ProSe Direct Communication. It is used as a destination Layer-2 address in all the packets the UE sends to this group.

The transmission mode, when sending data during D2D communication, may be either (i) unicast (i.e., a specific UE is the receiver), (ii) multicast (may also be denoted groupcast)(i.e., a group of UEs are receivers), or (iii) broadcast—all UEs are receivers.

For multicast transmissions, for example, in a "multicast MAC data PDU," the transmitting UE maps the ProSe identifiers to L2 addresses. For example, as illustrated in FIG. 2, the ProSe UE ID is mapped to a source L2 address carried in the MAC header, and the ProSe Layer-2 Group ID is mapped to destination layer 2 address carried in the MAC header. Also, the ProSe identifiers may also be mapped onto different addresses and mechanisms in the physical layer.

There are several purposes of the source and destination addresses in the MAC layer. One purpose is to perform MAC filtering (i.e., to discard data PDUs already in MAC which are not intended for the receiving UE). However, another important purpose is to enable the receiving UE to identify the receiving RLC entity (i.e., to support reassembly in RLC). The combination of source and destination addresses identifies the receiving RLC entity.

The physical layer also provides potential mechanisms, which may be used as part of a D2D communication addressing scheme. In Rel-8 LTE, an example of an implicit addressing mechanism is the physical cell identity, as defined by the PSS/SSS synchronization signal transmitted by the eNB. A UE receiving a data block using a given synchronization signal as a timing reference, should be able to distinguish this data block from another data block using a different synchronization signal as a timing reference.

As an example, a D2D Synchronization Source transmits a D2D Synchronization Signal, which in turn includes an identification mechanism (e.g., by having the UE choose one of several synchronization signal patterns). A UE that receives two data blocks, which use different D2D Synchronization Signals as timing references, should be able to distinguish the two data blocks.

Additionally, the scheduling assignment also includes an identity. This "L1 identity" is used by the receiver for physical layer filtering of the scheduling assignments. If the "L1 identity" is based on the destination address of the data, it facilitates DRX in the receiver for multicast and unicast. For broadcast, the destination address is a fixed broadcast address and the same applies for the "L1 identity".

There are two existing proposed solutions for addressing for D2D communication. The first solution directly uses the ProSe identifiers as addresses. This solution is very similar with the MAC addressing scheme in the IEEE 802.x series specifications, where the globally unique 48-bit MAC address is transferred in the MAC PDUs as source and destination address.

The second solution is directed towards using a much shorter address (such as 16 bits) in the MAC layer. This address may be allocated by the base station (as the C-RNTI in UMTS and LTE) or a random number allocated by the UE itself (as done in the random access message in GSM). In the second existing solution applied on the broadcast transmission mode, assuming the address length of 16 bits for source L2 address, these 16 bits will likely cause two UEs to use the same addresses resulting in collisions. For broadcast transmissions, in some embodiments, only 16 bits are used.

In an addressing collision (e.g., two transmitters within a certain time window use the same pair of source and destination L2 address in the same set of radio resources), the receiving RLC entity needs to handle received RLC PDUs from two transmitting RLC entities. This conflict results in a discard of correct data already in the receiving RLC entity due to the maintenance of the RLC reordering window.

Moreover, if data intended for a different receiver is processed by the incorrect RLC entity and forwarded to upper layers, the resulting application data will most probably be unreadable after decryption. Furthermore, there is a data confidentiality risk by having UEs receiving data for which they are not intended receivers.

The first existing solution uses unique addresses, but these are very big. By directly mapping these large (e.g. 48-bits) identifiers onto the source and destination L2 addresses in the MAC layer, the overhead will be around 100 bits for a VoIP packet of 400 bits, which is around 25%. By using shorter addresses in the MAC layer, the transport blocks can be smaller than 400 bits, resulting in better coverage (range), lower transmit power and lower interference. Alternatively, the 400 bits can be used by VoIP data instead.

Assuming that a globally unique L2 address would require an address size of around 48 bits, there is clearly a trade-off between a level of uniqueness of the L2 address and system performance factors such as coverage. It is observed that when using VoIP without feedback, full IP headers need to be sent periodically, which implies a non-negligible overhead also on layer 3.

If we assume that layer 1 is able to handle MAC PDUs of maximum 400 bits, the MAC header must be a reasonable size. If using large L2 addresses of, for example 48 bits, the resulting MAC header will be in the order of 100-110 bits, which is more than 25% overhead.

SUMMARY

According to some embodiments, a method implemented in a first user equipment (UE) includes generating a first intermediate address. The method further includes transmitting a data packet using the first intermediate address by (i) applying a first address mechanism to a first part of the first intermediate address, and (ii) applying a second address mechanism to a second part of the first intermediate address.

In some embodiments, a method implemented in a first user equipment (UE) includes generating an intermediate destination address. The method further includes receiving a data packet from a second UE, the received data packet including a received destination address and a received source address. The method further includes comparing a first part of the intermediate destination address with the received destination address using a first address mechanism. Furthermore, in response to determining that the first part of the intermediate destination address matches the received destination address, the method includes comparing a second part of the intermediate destination address with received destination address using a second address mechanism. Also, in response to determining that the second part of the intermediate destination address matches the received destination address, identifying a receiving function in the first UE using the received source address and a third address mechanism.

According to some embodiments, a first user equipment (UE), includes a processor and a computer readable medium coupled to the processor. The computer readable medium contains instructions executable by the processor. The first UE is operative to generate a first intermediate address. The first UE is further operative to transmit a data packet using the first intermediate address by (i) applying a first address mechanism to a first part of the first intermediate address, and (ii) applying a second address mechanism to a second part of the first intermediate address.

According to some embodiments, a first user equipment (UE), includes a processor and a computer readable medium coupled to the processor. The computer readable medium contains instructions executable by the processor. The first UE is operative to generate an intermediate destination address. The first UE is further operative to receive a data packet from a second UE, the received data packet including a received destination address and a received source address. The first UE is further operative to compare a first part of the intermediate destination address with the received destination address using a first address mechanism. Furthermore, in response to determining that the first part of the intermediate destination address matches the received destination address, the first UE is operative to compare a second part of the intermediate destination address with received destination address using a second address mechanism. Additionally, in response to determining that the second part of the intermediate destination address matches the received destination address, identify a receiving function in the first UE using the received source address and a third address mechanism.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
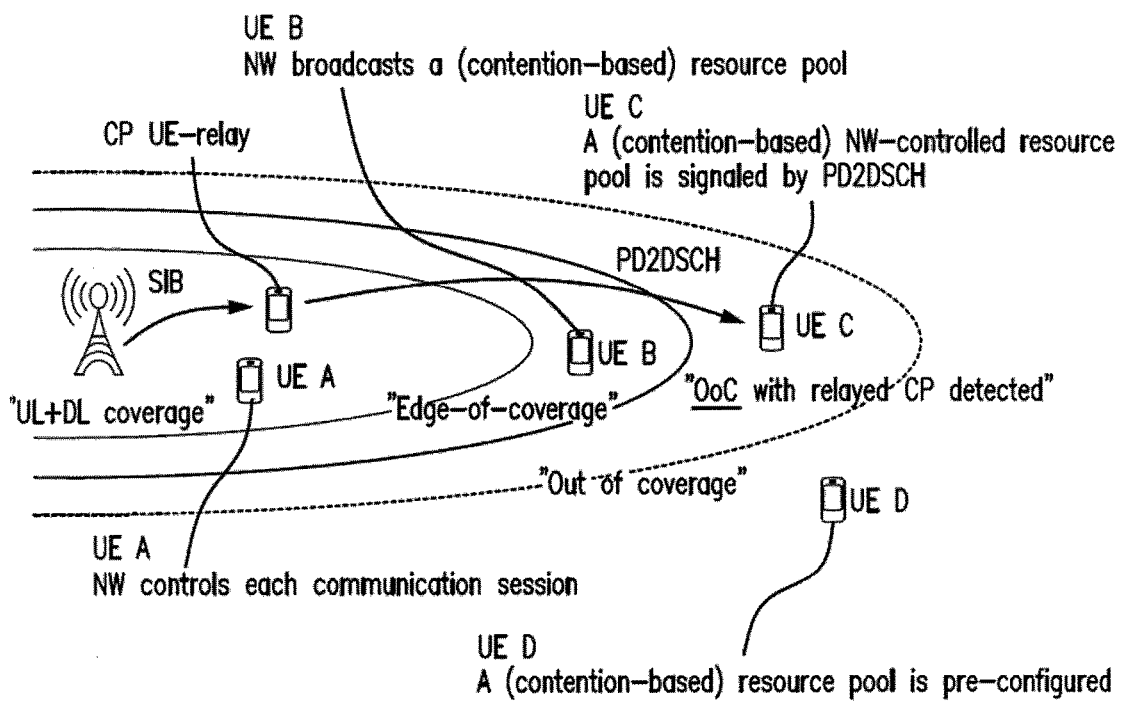
FIG. 1 is an illustration of different type of network coverages for D2D communication.
Figure 2:
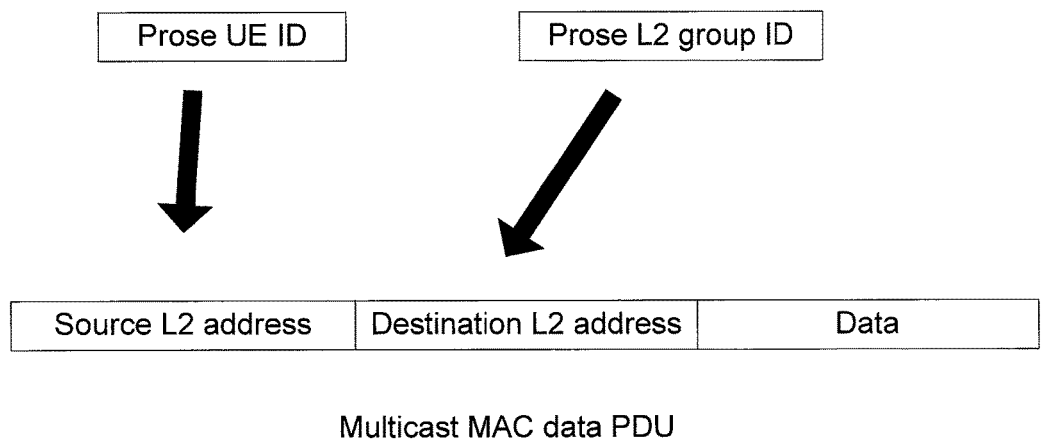
FIG. 2 is an illustration of mapping ProSe identifiers to MAC addresses.
Figure 3:
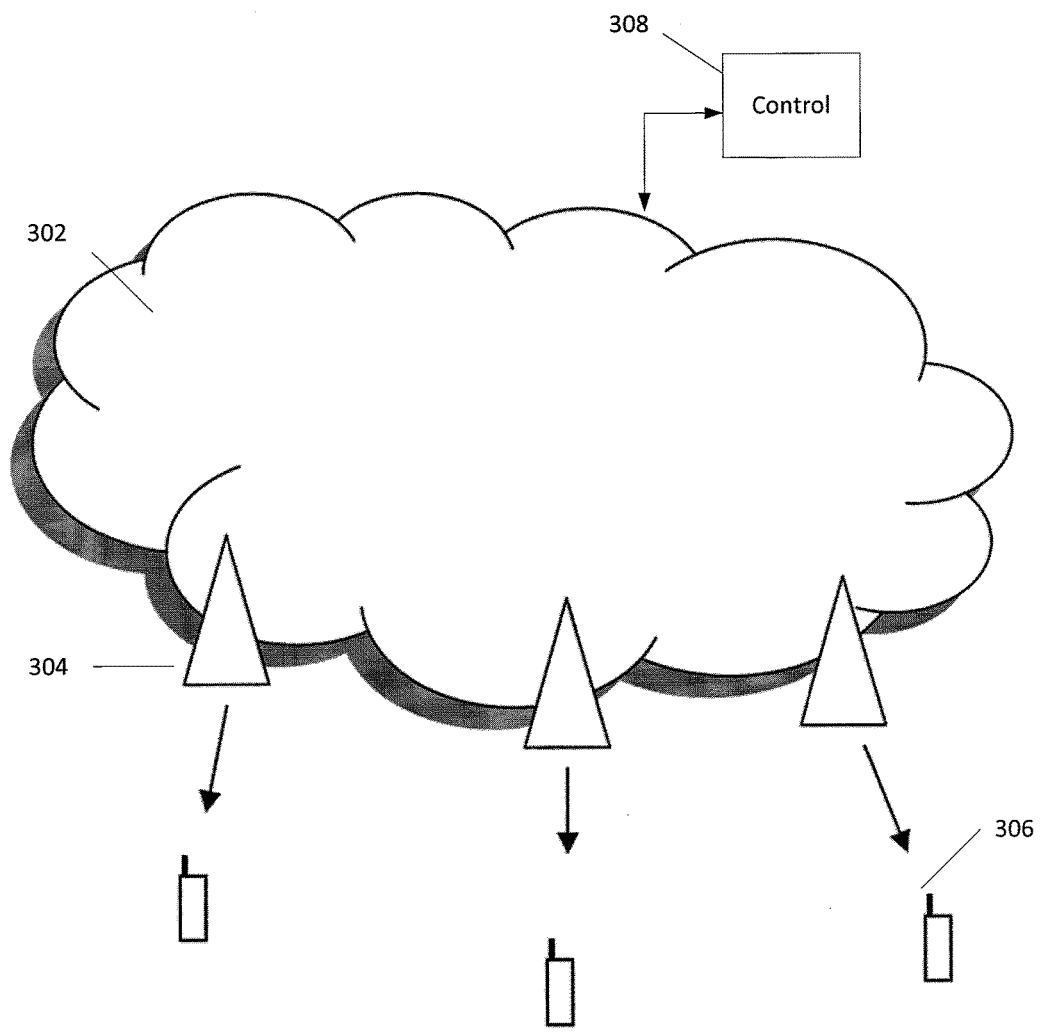
FIG. 3 is an illustration of an exemplary wireless communication system in accordance with exemplary embodiments.

Referring to FIG. 3, a wireless communication deployment 300 in accordance with exemplary embodiments includes an access node 304 serving a wireless communication device (WCD) 306. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 306 may be a legacy UE or dynamic TDD capable UE. Access node 304 may be, for example, a base station, an eNodeB, relay node, or gateway type device, and is capable of communicating with device 306, along with any additional elements suitable to support wireless communication between wireless communication devices or between a wireless communication device and another communication device, such as landline telephone. The access node 304 may be in communication with, for instance via a network 302, one or more control nodes 308, such as a Radio Network Controller (RNC), a Mobility Management Entity (MME), a Mobile Switching Center (MSC) or Base Station Subsystem (BSS). Although node 308 is explicitly identified as a control node, each of nodes 304, 306, and 308 may be understood as a "control" node to the extent that it includes a control unit or otherwise implements control functions.

According to some embodiments, an addressing mechanism enables addresses to be created among a wide range of type and length of identities. For example, ProSe identifiers may be transformed into intermediate source and destination address strings of e.g. 32 bits. Additionally, the content of these intermediate source and destination address strings may be partitioned into available addressing mechanisms in the Layer 1 and Layer 2 to transfer as many unique bits of the addresses as possible.

When the UE is outside network coverage, the UE, for example, uses preconfigured addresses and radio resources (e.g., in the UICC/USIM). To enable UEs, such as public safety UEs, from different Public Land Mobile Networks (PLMNs) communicate also outside network coverage, they need to rely upon that their preconfigured ProSe identities are valid also in this scenario. In some embodiments, the ProSe identifiers are globally unique. A public safety UE is a UE with special capabilities for public safety use (i.e., for use by rescue personnel such as firemen, or even homeland security authorities). However, it is understood by one of ordinary skill in the art that the embodiments described herein are not limited to public safety UEs.

Figure 4:
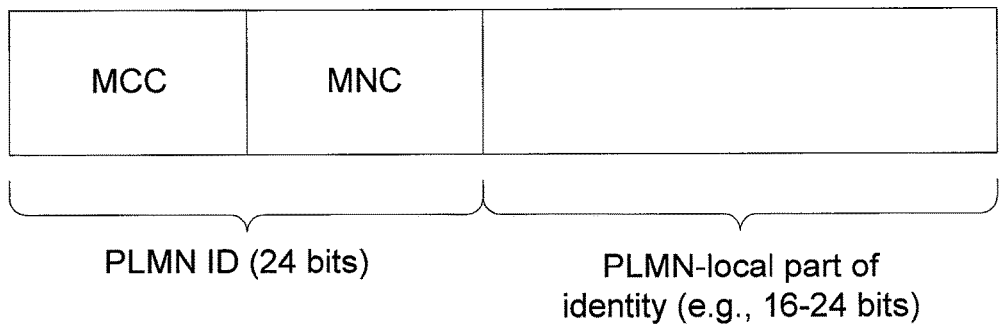
FIG. 4 is an illustration of an exemplary structure of ProSe identifiers for communication.

The ProSe UE ID and ProSe Layer-2 Group ID may be assigned by the network operator of a particular PLMN. To ensure a globally unique identifier, the PLMN identity is used as a prefix, and the remaining part of the identifier is assigned to the operator of the given PLMN. According to some embodiments, the same principle is used for the ProSe UE ID and ProSe Layer-2 Group ID. FIG. 4 illustrates an embodiment of a structure of ProSe identifiers for communication.

Taking into account that there are mechanisms available also in the Layer 1 for addressing, a 48-bit ProSe ID does not automatically mean that the ProSe ID is used solely in the Layer 2 as an address. Moreover, the number of PLMN IDs in use by a group of transmitters and receivers may typically be much less than the total range of PLMN IDs available. In some scenarios all communicating UEs use the same PLMN ID. For example, a common scenario regarding for public safety UEs is that public safety UEs in an area originate from the same PLMN (e.g., a PLMN that realizes a nationwide public safety network). Some embodiments reduce the PLMN ID from 24 bits to a shorter value by using, for example, a hash on the PLMN ID before using the PLMN ID for addressing.

A comparison of the collision risks for different L2 address sizes indicates that with a source L2 address size of as small as 16 bits, the collision risk is 1% with as many as 37 simultaneous transmitters belonging to the same multicast group. However, for multicast and unicast transmissions, both source and destination addresses are used, where for example, 16 bits are used as a destination address and the total address size is 32 bits, the collision risk is virtually zero (i.e., 0.1% collision risk with 2932 simultaneous transmitters).

As an example, if the UE participates in a ProSe multicast communication, the UE may first use the ProSe UE ID to create an intermediate source address bit string of 32 bits. This mapping takes into account that the PLMN ID part of the ProSe UE ID has the same value for a large population of the UEs, but may be different for a few UEs. The UE may further create intermediate destination address strings for each ProSe multicast group to which the UE communicates with.

Figure 5:
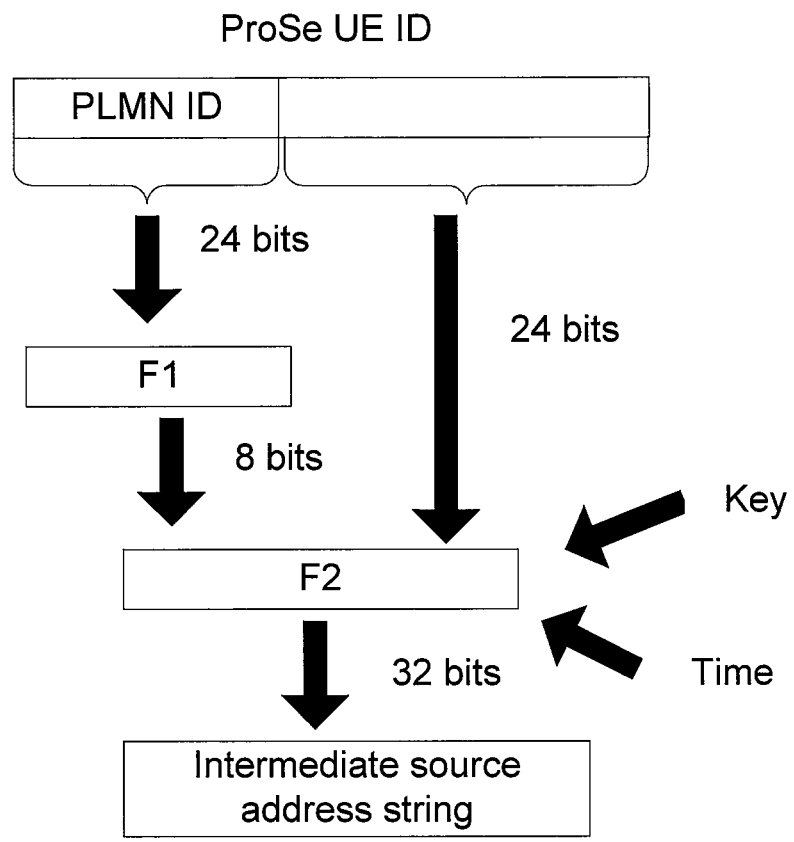
FIG. 5 is an illustration of an exemplary construction of an intermediate source address string.
Figure 6:
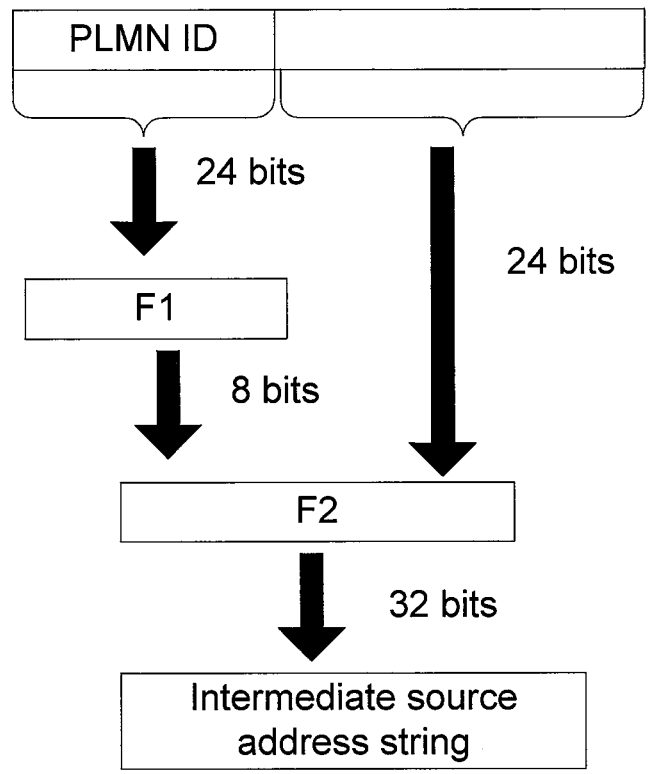
FIG. 6 is an illustration of an exemplary construction of an intermediate destination address string.

FIG. 5 illustrates an embodiment of a construction of an intermediate source address string using a ProSe UE ID. FIG. 6 illustrates an embodiment of construction of an intermediate destination address string using the ProSe Layer-2 Group ID. The ProSe Layer-2 Group ID may be used for constructing the intermediate destination address string when the UE participates in a multicast communication. However, when the transmitting UE participates in a unicast communication, the ProSe UE ID of the receiving UE that receives packets from the transmitting UE may be used for constructing the intermediate destination address string. Although the ProSe UE ID is used as a global identity, other global identities may be used such as IMSI and GUTI.

As illustrated in FIGS. 5 and 6, the PLMN ID is first reduced to 8 bits using a hash function F1. These 8 bits are concatenated with the remaining 24 bits of the ProSe UE ID (FIG. 5) and Prose Layer-2 Group ID (FIG. 6), respectively, and forwarded into a scrambling function F2. This scrambling function may use time-dependent variables to further reduce collisions. For example, the scrambling function may use a hash that is dependent on a new timestamp as input each time the UE is powered on, or with an integer that is stepped after each input into the scrambling function. The scrambled results of 32 bits forms the intermediate source (FIG. 5) and destination (FIG. 6) address strings. An example of a scrambling function is the scrambling performed on the physical channels in 3GPP LTE, such as the Physical Broadcast Channel (PBCH). The PBCH is scrambled by bitwise modulo-2-addition with a scrambling bit sequence, and the latter is selected using the physical cell identity. A similar principle may be used for the F2 scrambling function, where the scrambling bit sequence is selected and/or initialized with the integer T.

In some embodiments, the source address is not traceable to the global identity of the UE (e.g., IMSI, GUTI, or ProSe UE ID), which provides security for the UE. According to some embodiments, when generating the intermediate source address string using a global identity, the UE may use a private key as input (e.g., input into the scrambling function), to make it more difficult to identify the UE. Other options include using a random number or using the time when the address is generated, or a combination of these parameters, as input into the scrambling function. In some embodiments, the UE may generate a random number with the required address size (e.g., 32 bits), and use this random number as the intermediate source address string.

In one embodiment, the ProSe UE ID is used directly as the intermediate source address string. The intermediate source address string is in this embodiment also known as the Source Layer-2 ID and is 24 bits long. Moreover, for multicast the ProSe Layer-2 Group ID is used directly as the intermediate destination address string. The intermediate destination address string is in this embodiment also known as the Destination Layer-2 ID and is 24 bits long.

Figure 7:
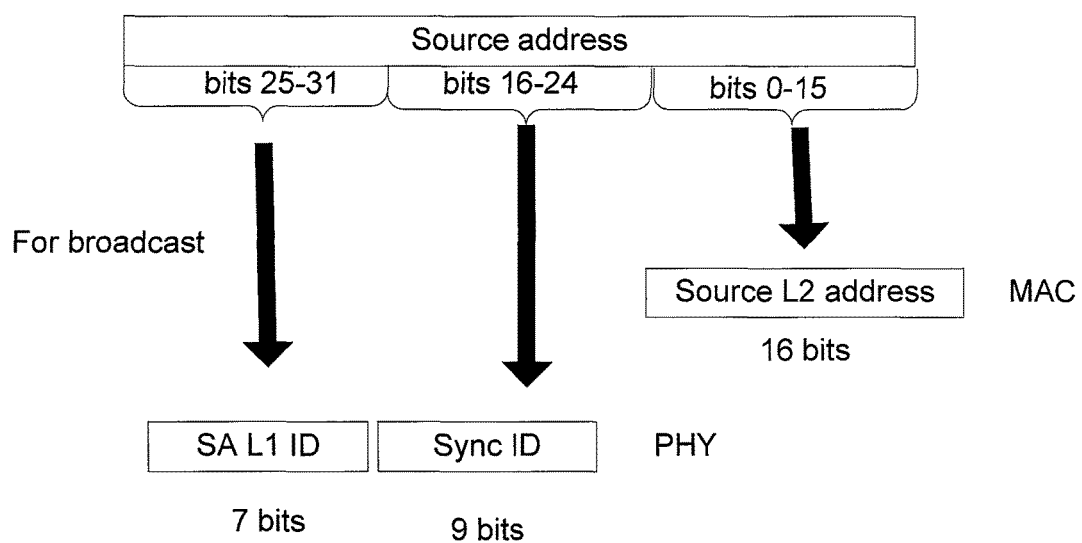
FIG. 7 is an exemplary illustration of mapping a source address string onto L1 and L2 addresses.

According to some embodiments, when transmitting data, the UE uses the intermediate source address as input to different address mechanisms in the Layer 1 and the Layer 2. FIG. 7 illustrates in an embodiment of using the Layer 1 and Layer 2 addressing mechanisms on the intermediate source address. As an example, the Layer 1 and Layer 2 addressing mechanisms partition the intermediate source address into separate Layer 1 and Layer 2 source addresses. As illustrated in FIG. 7, nine bits (e.g., bits 16-24) of the intermediate source address are used to create a sync signal identity (assuming the UE is out of coverage and needs to create its own sync signal), and sixteen bits (e.g., bits 0-15) are used as a source address in Layer 2. The Sync ID is a Layer 1 address used to select a synchronization signal sequence sent explicitly as an address in the layer 1 as well. For broadcast transmissions, seven bits (e.g., bits 25-31) are used for the source address (SA) SA "L1 identity."

Figure 8:
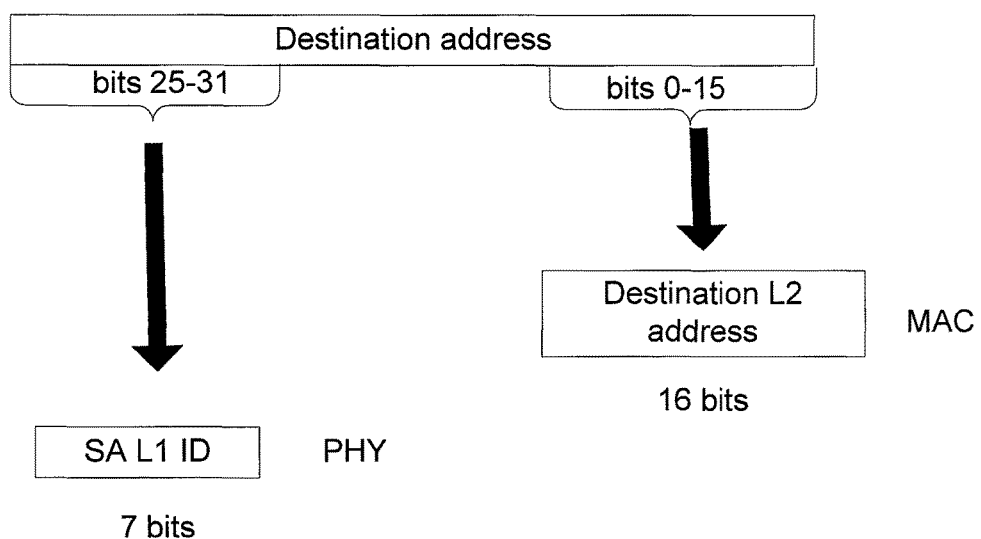
FIG. 8 is an exemplary illustration of mapping a source address string onto L1 and L2 addresses for unicast and multicast transmissions.

According to some embodiments, for unicast or multicast transmissions, the transmitting UE uses the intermediate destination address of 32 bits as input to address mechanisms in the Layer 1 and Layer 2. FIG. 8 illustrates an embodiment of using the Layer 1 and Layer 2 addressing mechanisms on the intermediate destination address. As an example, the Layer 1 and Layer 2 addressing mechanisms partition the intermediate source address into separate Layer 1 and Layer 2 destination addresses. As illustrated in FIG. 8, seven bits of the intermediate destination address (e.g., bits 25-31) are used as the "L1 identity" (e.g., L1 destination address) in the scheduling assignment in order to enable DRX for the UEs, which does not monitor this particular group, and sixteen bits (e.g., bits 0-15) are used as a destination L2 address.

As an example, a UE typically monitors a selected subset of all available multicast groups. Thus, there may be scheduling assignments received which indicate groups other than the one the UE monitors, in the L1 identity (assuming it is set to the destination address). When receiving such a scheduling assignment (i.e., assignment meant for another group), this particular UE does not need to read the subsequent data packet, and thus, the UE's radio receiving can go to "sleep" until the needs to read the next scheduling assignment (assuming the scheduling assignments are set in predetermined time interval). This process of going into sleep and wake up regularly is called "DRX" (Dissentious Reception).

According to some embodiments, the receiving UE detects an address collision by checking the RLC sequence number included in a received packet. In case of a VoIP service, the VoIP packets may be sent in regular intervals (e.g., each 20 ms). Therefore, when a VoIP packet is received 20 ms after the previous VoIP packet, the receiving UE expects that the RLC sequence number has been incremented by one (i.e., if the RLC sequence number in the previous VoIP packet was N, the next packet should have N+1). If the incorrect RLC sequence number is detected (e.g., if the sequence number is lower than N or is higher than N+TH, where TH is a threshold, for example, 2), the receiving RLC entity may drop the packet since the packet is probably not intended for this UE, which indicates that an address collision has occurred.

When an address collision is detected, the receiving UE may drop the receive RLC packet. Furthermore, when the address collision is detected, the receiving UE may check the addresses again in the situation where the receiving UE only initially checked a part of the source and/or destination addresses (e.g., only the MAC address). The receiver may check the L1 addresses to try to find the correct packet. Additionally, when the address collision is detected, the receiving UE may send a message to the transmitting UEs that may use the same source addresses, where the message indicates that these transmitting UEs should perform a new generation of source addresses. Upon receiving this message, these UEs may then run the scrambling function with a new time stamp as input.

Figure 9:
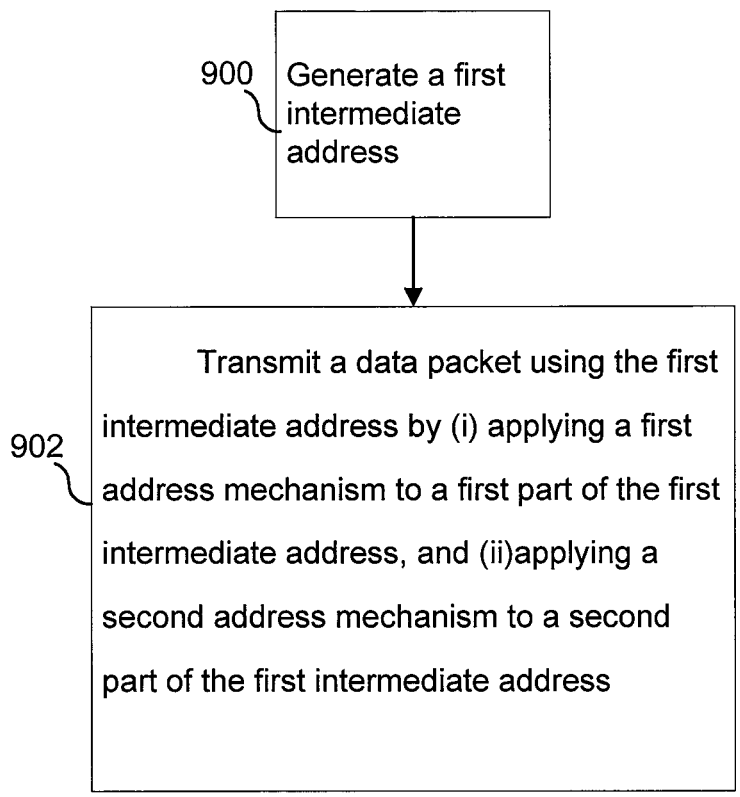
FIGS. 9 and 10 are exemplary illustrations of a flow chart of a process performed by a transmitting UE.

FIG. 9 illustrates an embodiment of a process performed by a transmitting UE. This process may generally start at step 900 where the transmitting UE generates a first intermediate address. As an example, the transmitting UE may generate the intermediate source address or destination source address as illustrated in FIGS. 5 and 6, respectively. Step 900 may be performed for each communication session the UE is involved with (e.g., a UE may have a multicast communication session simultaneously with a unicast communication session).

In step 902, the transmitting UE transmits a data packet using the first intermediate address by (i) applying a first address mechanism to a first part of the first intermediate address, and (ii) applying a second address mechanism to a second part of the first intermediate address. As an example, as illustrated in FIG. 7, the first address mechanism may be a Layer 1 address mechanism applied to bits 24-31 of the intermediate source address (i.e., the first part of the first intermediate address includes the most significant bit (MSB) of the first intermediate address), and the second address mechanism may be a Layer 2 address mechanism applied to bits 0-15 of the intermediate source address (i.e., the second part of the first intermediate address includes the least significant bit (LSB) of the first intermediate address).

According to some embodiments, generating the first intermediate address includes applying a first function (F1) to a first part of a first identifier, and applying a second function (F2) to (i) a second part of the first identifier and (ii) the output of the first function applied to the first part of the first identifier, where the first intermediate address is the output of the second function, and a number of bits included in the first intermediate address is less than a number of bits included in the first identifier. In some embodiments, where the first function is a hashing function, the second function is a scrambling function, and the first identifier is a Proximity-based services (ProSe) UE ID associated with the first UE.

According to some embodiments, the output of the hashing function reduces a number of bits included in the first part of the identifier associated with the first UE. In some embodiments, the first part of the identifier associated with the first UE is a network ID. In some embodiments, the first intermediate address is an intermediate source address. In some embodiments, the first address mechanism is a Layer 1 address mechanism that uses the first part of the intermediate source address as a Layer 1 source address, and the second address mechanism is a Layer 2 address mechanism that uses the second part of the intermediate source address as a Layer 2 source address.

Figure 10:
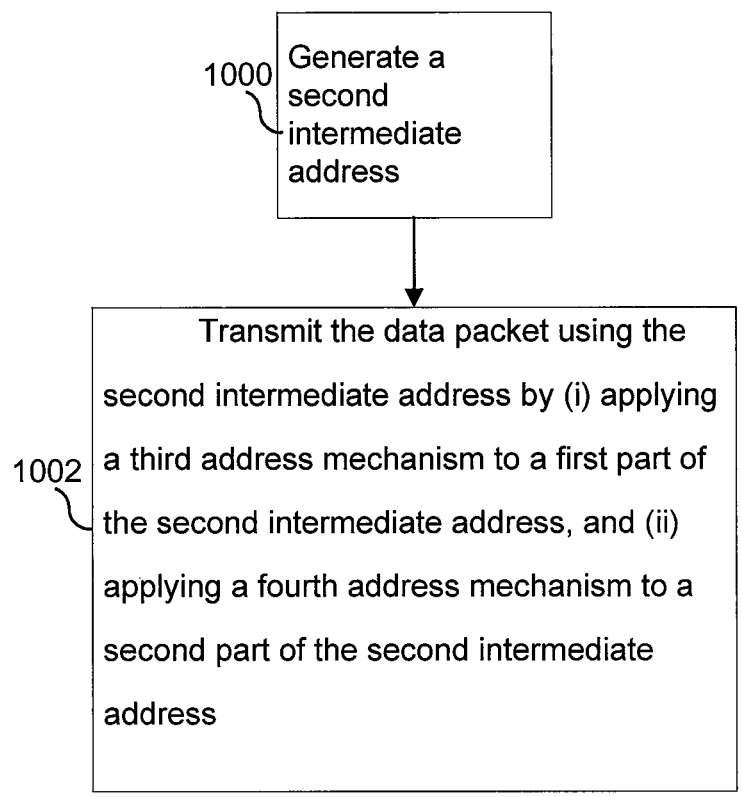

FIG. 10 illustrates an embodiment of additional steps performed by the transmitting UE. The process may generally start at step 1000 where the transmitting UE generates a second intermediate address. This second intermediate address may be an intermediary destination address constructed as illustrated in FIG. 6.

In step 1002, the transmitting UE transmits the data packet using the second intermediate address by (i) applying a third address mechanism to a first part of the second intermediate address, and (ii) applying a fourth address mechanism to a second part of the second intermediate address. As an example, as illustrated in FIG. 8, the third address mechanism may be a Layer 1 address mechanism applied to bits 25-31 of the intermediate destination address (i.e., the first part of the second intermediate address includes the (MSB) of the second intermediate address), and the fourth address mechanism may be a Layer 2 address mechanism applied to bits 0-15 of the intermediate source address (i.e., the second part of the second intermediate address includes the LSB of the second intermediate address).

The steps illustrated in FIGS. 9 and 10 are not limited to the order illustrated in these figures.

According to some embodiments, generating the second intermediate address includes applying a first function to a first part of a second identifier, and applying a second function to (i) a second part of the second identifier and (ii) the output of the first function applied to the first part of the second identifier, where the second intermediate address is the output of the second function, and a number of bits included in the second intermediate address is less than a number of bits included in the second identifier. In some embodiments, the first function is a hashing function, and the second function is a scrambling function.

According to some embodiments, the second identifier is a Proximity-based services (ProSe) UE ID associated with a second UE to which the first UE transmits the data packet. In some embodiments, the second identifier is a Proximity-based services (ProSe) Group ID associated with a plurality of UEs to which the first UE transmits the data packet. In some embodiments, the second intermediate address is an intermediate destination address. In some embodiments, the third address mechanism is a Layer 1 address mechanism that uses the first part of the intermediate destination address as a Layer 1 destination address, and the fourth address mechanism is a Layer 2 address mechanism that uses the second part of the intermediate destination address as a Layer 2 destination address. In some embodiments, the first intermediate address is generated using a random number having a predetermined number of bits.

Figure 11:
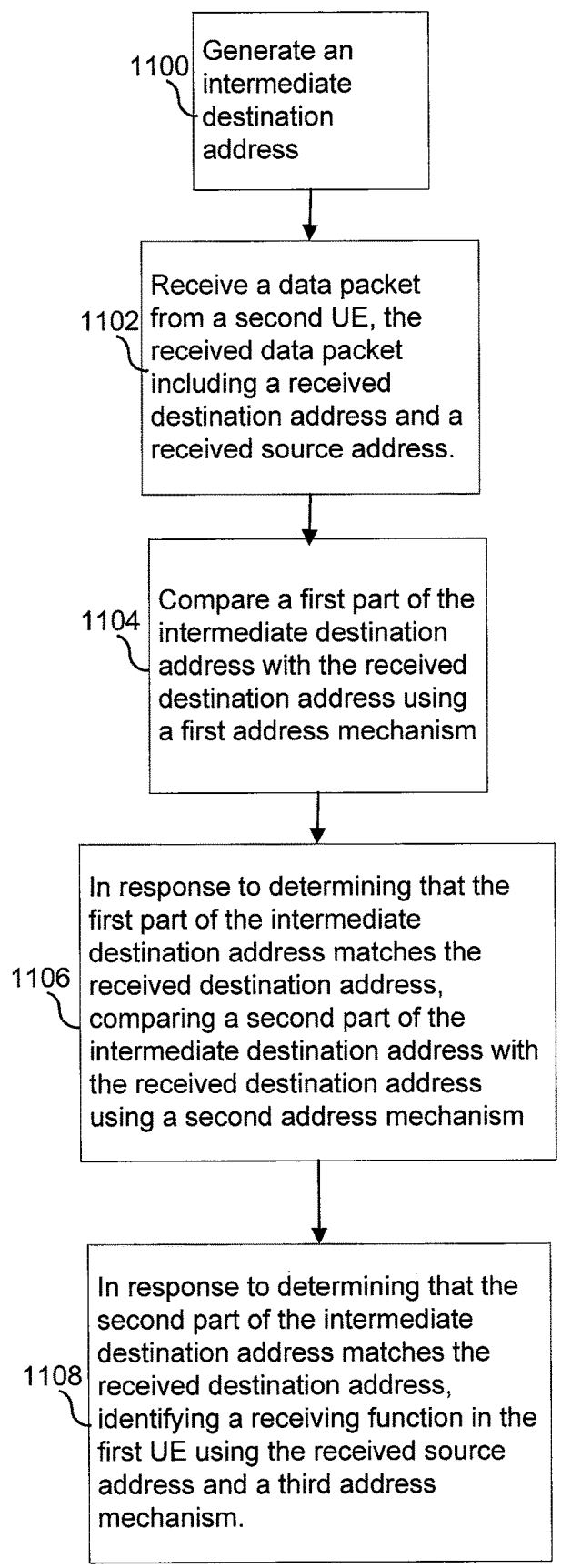
FIGS. 11 and 12 are exemplary illustrations of a flow chart of a process performed by a receiving UE.

FIG. 11 illustrates an embodiment of a process performed by a receiving UE. The process may generally start at step 1100 where the receiving UE generates an intermediate destination address. The intermediate destination address may be generated as illustrated in FIG. 6. Step 1100 may be performed for each communication session the UE is involved with (e.g., a UE may have a multicast communication session simultaneously with a unicast communication session).

In step 1102, the receiving UE receives a data packet from a second UE, where the received data packet includes a received destination address and a received source address. In step 1104, the receiving UE compares a first part of the intermediate destination address with the received destination address using a first address mechanism. The first address mechanism may be a Layer 1 address mechanism for destination addresses.

In step 1106, in response to determining that the first part of the intermediate destination address matches the received destination address, the receiving UE compares a second part of the intermediate destination address with the received destination address using a second address mechanism. The second address mechanism may be a Layer 2 address mechanism for destination addresses.

In step 1108, in response to determining that the second part of the intermediate destination address matches the received destination address, the receiving UE identifies a receiving function in the first UE using the received source address and a third address mechanism. The third address mechanism may be a Layer 1 address mechanism for source address. An example of a receiving function is an entity, such as a piece of software, in the UE which should process the particular packets received during a communication session, (e.g., packets from one transmitter and sent to a particular multicast group). A UE typically has a number of simultaneous receiving functions.

Figure 12:
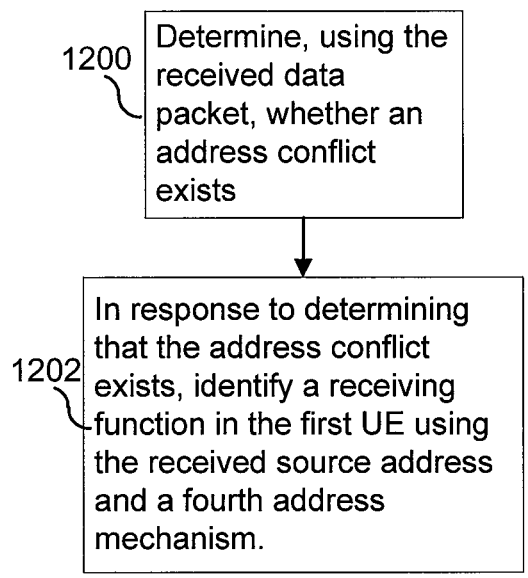

FIG. 12 illustrates an embodiment of another process performed by the receiving UE. The process may generally start at step 1200 where the receiving UE determines, using the received data packet, whether an address conflict exists. In step 1202, in response to determining that the address conflict exists, the receiving UE identifies a receiving function in the first UE using the received source address and a fourth address mechanism. As an example, the fourth address mechanism may be a Layer 2 address mechanism for source addresses.

The steps illustrated in FIGS. 11 and 12 are not limited to the order presented in these figures. For example, step 1200 may be performed immediately after step 1100. Similarly, the order of the steps illustrated in FIG. 11 is not limited to the illustrated order.

According to some embodiments, the first address mechanism is a Layer 1 address mechanism that extracts the first part of the intermediate destination address as a Layer 1 destination address, the second address mechanism is a Layer 2 address mechanism that extracts the second part of the intermediate destination address as a Layer 2 destination address, and the third address mechanism is a Layer 1 address mechanism that uses received source address as a Layer 1 source address. In some embodiments, the fourth address mechanism is a Layer 2 address mechanism that uses the received source address as a Layer 2 source address. In some embodiments, the address conflict is detected if a sequence number associated with the received data packet is out of order with respect to a sequence number of a previously received data packet.

Figure 13:
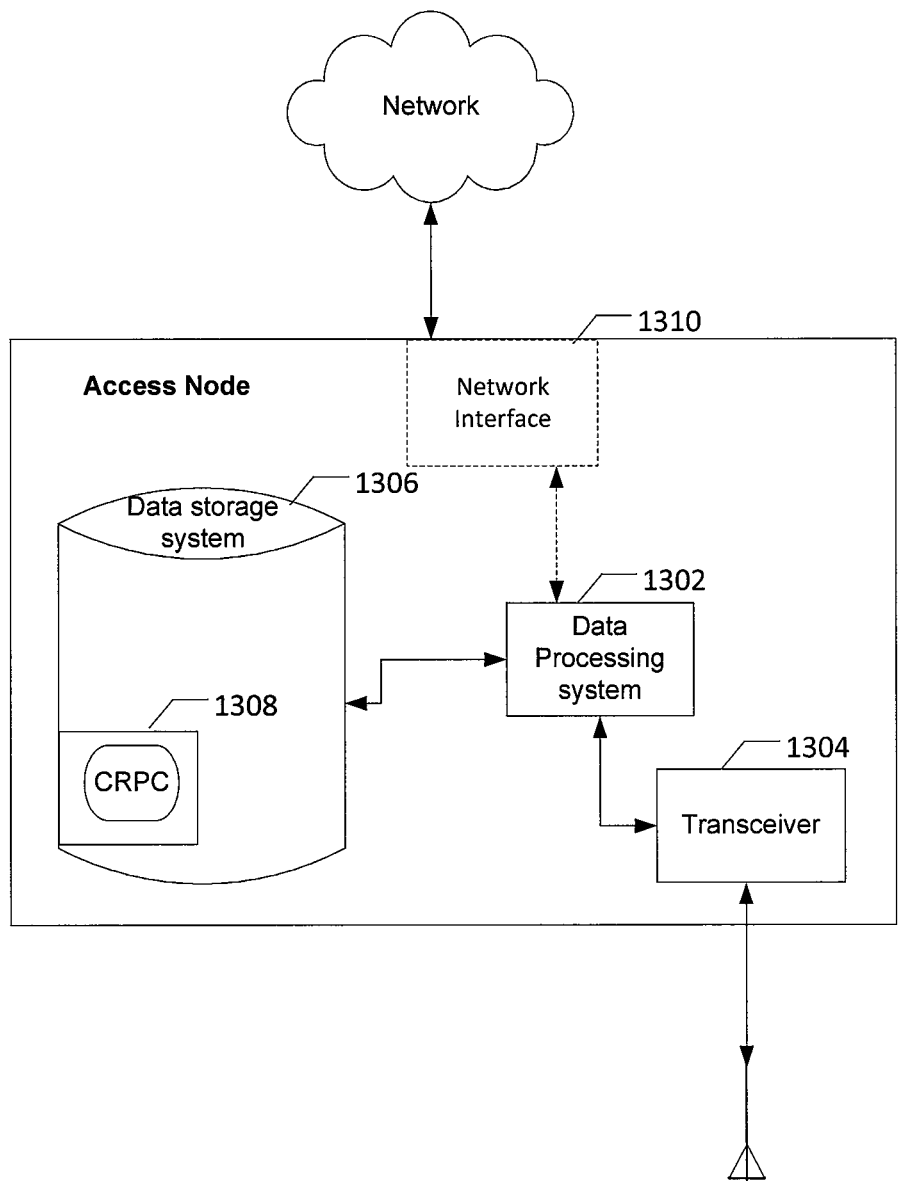
FIG. 13 illustrates an exemplary access node.

FIG. 13 illustrates a block diagram of an exemplary access node, such as node 304 shown in FIG. 3. As shown in FIG. 13, the access node 304 may include: a data processing system 1302, which may include one or more microprocessors and/or one or more circuits, such as an application specific integrated circuit (ASIC), field-programmable gate arrays (FPGAs), and the like; a network interface 1310; a transceiver 1304, and a data storage system 1306, which may include one or more non-volatile storage devices and/or one or more volatile storage devices (e.g., random access memory (RAM)). According to some embodiments, the data processing system 1302 may comprise a control unit used for selection of transmission parameters.

In embodiments where data processing system 1302 includes a microprocessor, computer readable program code (CRPC) 1308 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1302 to perform methods implemented by the access node. In other embodiments, the access node 304 is configured to perform steps described herein without the need for code. That is, for example, data processing system 1302 may consist merely of one or more ASICs. Hence, the features of the embodiments described herein may be implemented in hardware and/or software. For example, in particular embodiments, the functional components of the base station described above may be implemented by data processing system 1302 executing computer instructions, by data processing system 1302 operating independent of any computer instructions, or by any suitable combination of hardware and/or software.

Figure 14:
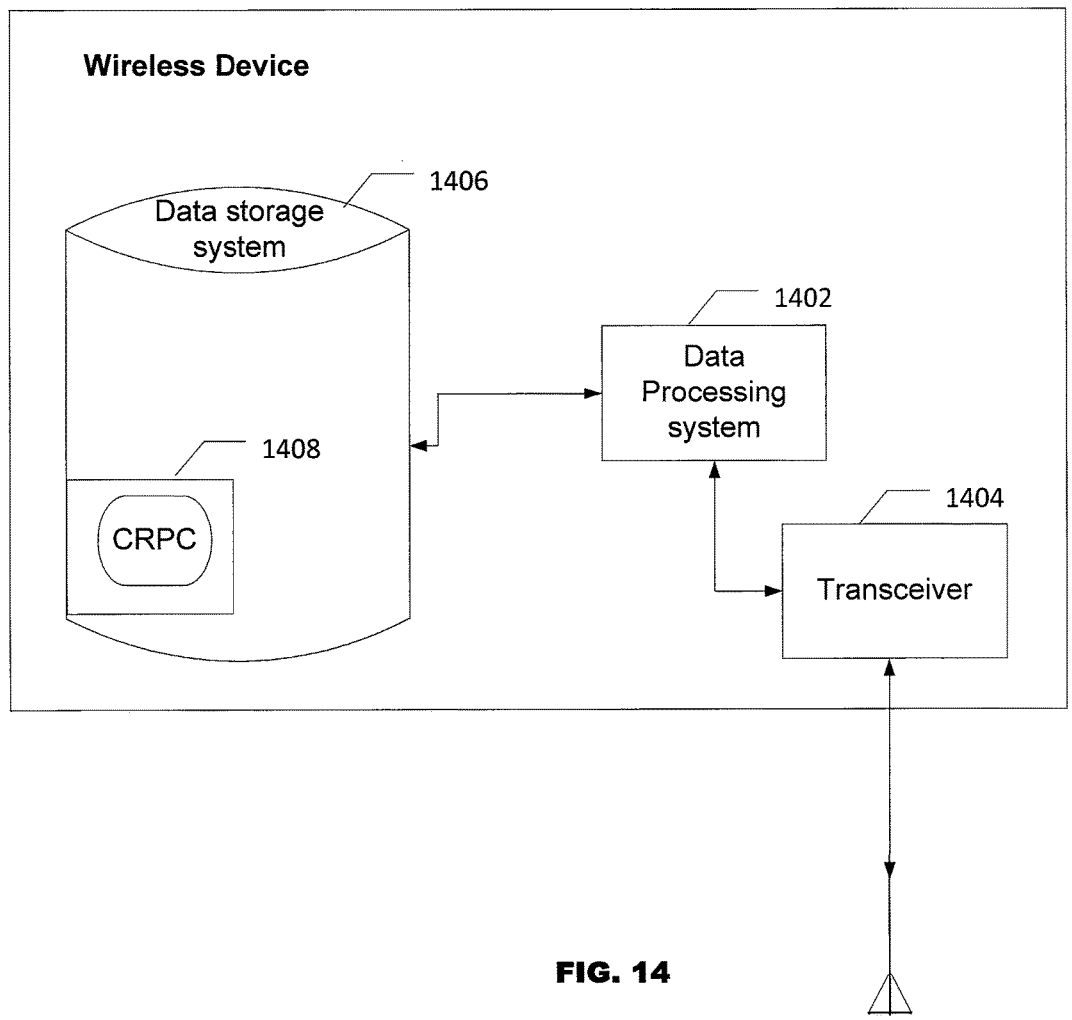
FIG. 14 illustrates an exemplary wireless device.

FIG. 14 illustrates a block diagram of an exemplary wireless device, such as device 306 shown in FIG. 3. As shown in FIG. 14, the device 306 may include: a data processing system 1402, which may include one or more microprocessors and/or one or more circuits, such as an application specific integrated circuit (ASIC), field-programmable gate arrays (FPGAs), and the like; a transceiver 1404, and a data storage system 1406, which may include one or more non-volatile storage devices and/or one or more volatile storage devices (e.g., random access memory (RAM)). According to some embodiments, the data processing system 1402 may comprise a control unit used for selection of transmission parameters.

In embodiments, where data processing system 1402 includes a microprocessor, computer readable program code (CRPC) 1408 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1402 to perform steps described above (e.g., steps described above with reference to the flow charts shown in FIGS. 9-12). In other embodiments, the device 306 is configured to perform steps described herein without the need for code. That is, for example, data processing system 1402 may consist merely of one or more ASICs. Hence, the features of the embodiments described herein may be implemented in hardware and/or software. For example, in particular embodiments, the functional components of the base station described above may be implemented by data processing system 1402 executing computer instructions, by data processing system 1402 operating independent of any computer instructions, or by any suitable combination of hardware and/or software.

Figure 15:
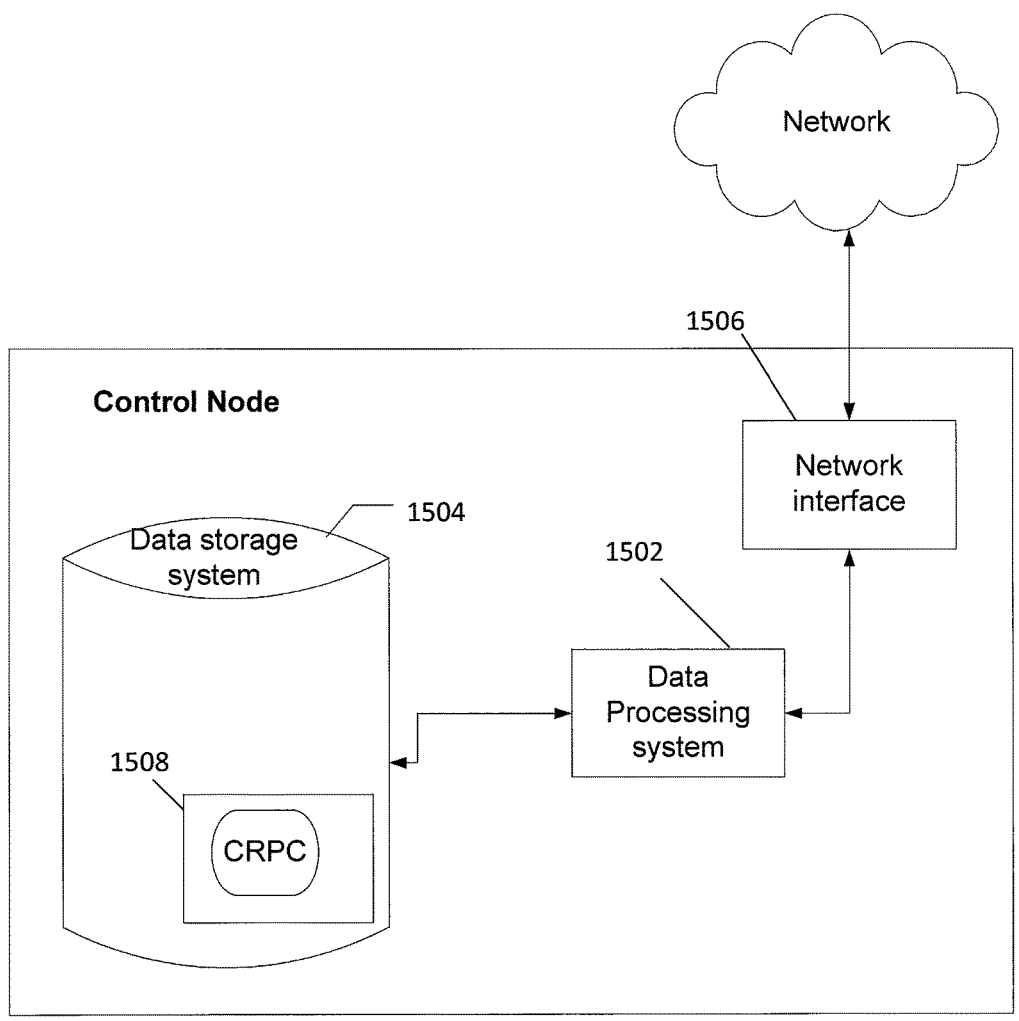
FIG. 15 illustrates and exemplary control node.

FIG. 15 illustrates a block diagram of an exemplary control node, such as node 308 shown in FIG. 3. As shown in FIG. 15, the control node 308 may include: a data processing system 1502, which may include one or more microprocessors and/or one or more circuits, such as an application specific integrated circuit (ASIC), field-programmable gate arrays (FPGAs), and the like; a network interface 1506, and a data storage system 1504, which may include one or more non-volatile storage devices and/or one or more volatile storage devices (e.g., random access memory (RAM)). According to some embodiments, the data processing system 1502 may comprise a control unit used for selection of transmission parameters.

In embodiments where data processing system 1502 includes a microprocessor, computer readable program code (CRPC) 1508 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1502 to perform processes implemented by the control node. In other embodiments, the control node 308 is configured to perform steps described herein without the need for code. That is, for example, data processing system 1502 may consist merely of one or more ASICs. Hence, the features of the embodiments described herein may be implemented in hardware and/or software. For example, in particular embodiments, the functional components of the base station described above may be implemented by data processing system 1502 executing computer instructions, by data processing system 1502 operating independent of any computer instructions, or by any suitable combination of hardware and/or software.

Advantages of the embodiments described herein include:

Enables finding of the best trade-off between sending small addresses while saving bandwidth vs. the risk of collision.

Reduces the size of the large global identifiers by having different grade of reduction for different parts. The part that has only a small variation (with respect to number of used values within the total value range)—e.g. the PLMN ID—is more reduced than the other parts.

Provides fixed size intermediate source and destination address strings, which allows for future expansion by adding mapping from other identifiers onto the intermediate address strings.

Time-dependent hashing/scrambling of the bits which enables recovery in the cases when two UEs would generate the same addresses.

Mapping the content of these intermediate source and destination address strings on different addressing mechanisms in layer 1 and layer 2 in order to make best use of the available address bits in the different addressing mechanisms—and avoiding duplication of address information.

Although terminology from 3GPP LTE has been used in this disclosure to exemplify the exemplary embodiments, one of ordinary skill in the art would understand this as not limiting the scope of the present embodiments to only the aforementioned system. Other wireless systems, including 3GPP HSPA, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP 3rd Generation Partnership Project
BSS Base Station Subsystem
CH Cluster Head
C-RNTI Cell Radio Network Temporary Identifier
D2D Device to Device Communication
DL Down Link
DRX Discontinuous Reception
EPS Evolved Packet System
GUTI Globally Unique Temporary Identity
InC In network Coverage
IMSI International Mobile Subscriber Identity
MAC Medium Access Control
MME Mobility Management Entity
MSC Mobile Switching Center OoC Out of Network Coverage
PBCH Physical Broadcast Channel
PD2DSCH Physical D2D Shared Channel
PDU Packet Data Unit
PLMN Public Land Mobile Network
ProSe Proximity-based Services
PSS Primary Synchronization Sequence
RLC Radio Link Control
RNC Radio Network Controller
RRC Radio Resource Control
SSS Secondary Synchronization Sequence
UICC Universal Integrated Circuit Card
UL Up Link
USIM Universal Subscriber Identity Module
UMTS Universal Mobile Telecommunications System
TDD Time Division Duplex

The invention claimed is:

1. A method implemented in a first user equipment (UE), the method comprising:
generating a first intermediate address from a first identifier by:
(i) applying a first function to a first part of the first identifier, and
(ii) applying a second function to (a) a second part of the first identifier and (b) the output of the first function applied to the first part of the first identifier,
wherein the first function is a hashing function, the second function is a scrambling function, the first intermediate address is the output of the second function, and a number of bits included in the first intermediate address is less than a number of bits included in the first identifier; and
transmitting a data packet using the first intermediate address by:
(i) applying a first address mechanism to a first part of the first intermediate address, and
(ii) applying a second address mechanism to a second part of the first intermediate address.

2. The method according to claim 1, wherein the first identifier is a Proximity-based services (ProSe) UE ID associated with the first UE.

3. The method according to claim 2, wherein the output of the hashing function reduces a number of bits included in the first part of the identifier associated with the first UE.

4. The method according to claim 1, wherein the first part of the identifier associated with the first UE is a network ID.

5. The method according to claim 1, wherein the first intermediate address is an intermediate source address.

6. The method according to claim 5, wherein the first address mechanism is a Layer 1 address mechanism that uses the first part of the intermediate source address as a Layer 1 source address, and the second address mechanism is a Layer 2 address mechanism that uses the second part of the intermediate source address as a Layer 2 source address.

7. The method according to claim 1, further comprising:
generating a second intermediate address; and
transmitting the data packet using the second intermediate address by:
(i) applying a third address mechanism to a first part of the first intermediate address, and
(ii) applying a fourth address mechanism to a second part of the first intermediate address.

8. The method according to claim 7, wherein generating the second intermediate address includes:
applying a first function to a first part of a second identifier, and
applying a second function to (i) a second part of the second identifier and (ii) the output of the first function applied to the first part of the second identifier,
wherein the second intermediate address is the output of the second function, and a number of bits included in the second intermediate address is less than a number of bits included in the second identifier.

9. The method according to claim 8, wherein the first function is a hashing function, and the second function is a scrambling function.

10. The method according to claim 9, wherein the second identifier is a Proximity-based services (ProSe) UE ID associated with a second UE to which the first UE transmits the data packet.

11. The method according to claim 9, wherein the second identifier is a Proximity-based services (ProSe) Group ID associated with a plurality of UEs to which the first UE transmits the data packet.

12. The method according to claim 7, wherein the second intermediate address is an intermediate destination address.

13. The method according to claim 7, wherein the first address mechanism is a Layer 1 address mechanism that uses the first part of the intermediate destination address as a Layer 1 destination address, and the fourth address mechanism is a Layer 2 address mechanism that uses the second part of the intermediate destination address as a Layer 2 destination address.

14. The method according to claim 1, wherein the first intermediate address is generated using a random number having a predetermined number of bits.

15. The method of claim 1, wherein the first function is not applied to the second part of the first identifier.

16. A first user equipment (UE), comprising:
a processor; and
a computer readable medium coupled to the processor, said computer readable medium containing instructions executable by the processor, whereby the first UE is operative to:
generate a first intermediate address from a first identifier by:
(i) applying a first function to a first part of a first identifier, and
(ii) applying a second function to (a) a second part of the first identifier and (b) the output of the first function applied to the first part of the first identifier,
wherein the first function is a hashing function, the second function is a scrambling function, the first intermediate address is the output of the second function, and a number of bits included in the first intermediate address is less than a number of bits included in the first identifier, and transmit a data packet using the first intermediate address by:
(i) applying a first address mechanism to a first part of the first intermediate address, and
(ii) applying a second address mechanism to a second part of the first intermediate address.

17. The first UE according to claim 16, wherein the first function is a hashing function, the second function is a scrambling function, and the first identifier is a Proximity-based services (ProSe) UE ID associated with the first UE.

18. The first UE according to claim 17, wherein the output of the hashing function reduces a number of bits included in the first part of the identifier associated with the first UE.

19. The first UE according to claim 16, wherein the first part of the identifier associated with the first UE is a network ID.

20. The first UE according to claim 16, wherein the first intermediate address is an intermediate source address.

21. The first UE according to claim 20, wherein the first address mechanism is a Layer 1 address mechanism that uses the first part of the intermediate source address as a Layer 1 source address, and the second address mechanism is a Layer 2 address mechanism that uses the second part of the intermediate source address as a Layer 2 source address.

22. The first UE according to claim 16, wherein the first UE is further operative to:
generate a second intermediate address; and
transmit the data packet using the second intermediate address by:
(i) applying a third address mechanism to a first part of the first intermediate address, and
(ii) applying a fourth address mechanism to a second part of the first intermediate address.

23. The first UE according to claim 22, wherein the first UE is further operative to generate the second intermediate address by:
applying a first function to a first part of a second identifier, and
applying a second function to (i) a second part of the second identifier and (ii) the output of the first function applied to the first part of the second identifier,
wherein the second intermediate address is the output of the second function, and a number of bits included in the second intermediate address is less than a number of bits included in the second identifier.

24. The first UE according to claim 23, wherein the first function is a hashing function, and the second function is a scrambling function.

25. The first UE according to claim 24, wherein the second identifier is a Proximity-based services (ProSe) UE ID associated with a second UE to which the first UE transmits the data packet.

26. The first UE according to claim 24, wherein the second identifier is a Proximity-based services (ProSe) Group ID associated with a plurality of UEs to which the first UE transmits the data packet.

27. The first UE according to claim 22, wherein the second intermediate address is an intermediate destination address.

28. The first UE according to claim 20, wherein the first address mechanism is a Layer 1 address mechanism that uses the first part of the intermediate destination address as a Layer 1 destination address, and the fourth address mechanism is a Layer 2 address mechanism that uses the second part of the intermediate destination address as a Layer 2 destination address.

29. The first UE according to claim 16, wherein the first intermediate address is generated using a random number having a predetermined number of bits.

* * * * *